United States Patent [19]

Peled et al.

[11] Patent Number: 5,472,808
[45] Date of Patent: Dec. 5, 1995

[54] SOLID ELECTROLYTE AND BATTERIES

[75] Inventors: Emanuel Peled, Even Yehuda; Diana Golodnitsky, Rishon-Le-Zion; Ronen Cohen, Ramat Ishai; Chen Menachem, Ariel, all of Israel

[73] Assignee: Ramot University Authority of Applied Research and Industrial Development Ltd., Tel-Aviv, Israel

[21] Appl. No.: 224,470

[22] Filed: Apr. 7, 1994

[30] Foreign Application Priority Data

Apr. 8, 1993 [IL] Israel ........................................ 105341

[51] Int. Cl.[6] .................................................... H01M 6/18
[52] U.S. Cl. ........................ 429/192; 429/193; 429/198; 429/199; 429/218; 429/221; 429/223
[58] Field of Search ................................ 429/192, 193, 429/198, 199, 218, 221, 223

[56] References Cited

U.S. PATENT DOCUMENTS

| | | | |
|---|---|---|---|
| 5,030,523 | 7/1991 | Neat et al. | 429/50 |
| 5,102,752 | 4/1992 | Hope et al. | 429/192 |
| 5,154,987 | 10/1992 | Hash et al. | 429/33 |
| 5,204,196 | 4/1993 | Yokomichi et al. | |

FOREIGN PATENT DOCUMENTS

| | | |
|---|---|---|
| 2534073 | 4/1984 | France . |
| 2157066 | 10/1985 | United Kingdom . |

OTHER PUBLICATIONS

G. Nagasubramanian et al., "Composite Solid Electrolyte for Li Battery Application", ECS Meeting, Toronto, Canada, Oct. 1992.

Primary Examiner—Stephen Kalafut
Assistant Examiner—M. Nuzzolillo
Attorney, Agent, or Firm—Keck, Mahin & Cate

[57] ABSTRACT

A composite solid electrolyte having a transference number above 0.5 for use in primary or secondary electrochemical cells. The solid electrolyte includes non-conductive oxide particles, of less than 5 microns in size, an alkali metal salt coating or in contact with these particles, an insulating elastomer forming a complex with the salt, and a solvent. Batteries and multi-cell batteries contain such solid electrolyte, and such batteries can be assembled with the cathod in the discharged state.

16 Claims, 11 Drawing Sheets

SOLID ELECTROLYTE AND BATTERIES

FIELD OF THE INVENTION

The present invention relates to improvements in electrochemical cells, and especially in such cells which have an anode which consists of or contains an alkali metal, and preferably lithium.

The invention relates more specifically to composite solid electrolytes (CSE) for use in such electrochemical cells, which CSEs have an alkali metal transference number of at least 0.5. The invention further relates to electrochemical cells, and preferably rechargeable cells which contain such solid electrolytes.

The preferred cathode materials for these cells are $FeS_2$, $CoS_2$, $NiS_2$ and their mixtures. The combination of these cathodes with the CSEs gives cells with an electrochemical overcharge protection mechanism.

BACKGROUND OF THE INVENTION

Solid alkali metal halides of the formula MX, where M is an alkali metal and X is a halide have a moderate ionic conductivity, and a low electronic conductivity. Conductivity takes place through M+X vacancy mechanism. An order of magnitude of conductivity can be gained ($10^{-5}$ mho cm$^{-1}$ at ambient temperature) by the mixing of LiI and $Al_2O_3$ powders and pressing into pellet form. Possible explanations are: (a) interfacial $Li^+$ conduction; (b) the increase of $Li^+$ vacancies concentration due to the intimate presence of $Al^{3+}$ at the LiI interface, the $Li^+$ conduction being mainly at the LiI/$Al_2O_3$ interface. On this basis an all solid Li/LiI-$Al_2O_3$/$PbI_2$ primary battery was developed.

However the LiI-$Al_2O_3$ pellets are very brittle and have little mechanical strength and are sensitive to thermal shock.

Attempts to use $Al_2O_3$ with polymers to improve the mechanical strength, in conjunction with lithium salts resulted in a too low Li transference number as too low salt concentrations or too large $Al_2O_3$ particles or unsuitable salts were used.

Known polymer electrolytes (PEs) have a number of drawbacks, such as a lithium transference number of only about 0.3 to 0.5 which leads to high concentration polarization and interface problems. Frequently salt anions such as $BF_4^-$, $AsF_6^-$ and $ClO_4^-$ were used which are not compatible with lithium. The above results in a high interfacial Li/PE resistance and lithium passivation. Furthermore the mechanical strength is not adequate, especially at elevated temperatures. The drawbacks set out above deterred the development of high-power high energy alkali metal (M) batteries using polymer electrolytes. Reactivity of the prior art anions with lithium or other alkali metals results in a thick passivating layer, having a high resistance. Furthermore polymer electrolytes tend to soften and start to flow at temperatures in the 100° C. range.

Recently, Nagasubramanian, Peled, Attia and Halpert, ECS Meeting, Toronto, Canada, October 1992, fabricated CSE films made of 12–17% 0.05μ $Al_2O_3$ particles, 40–55% LiI and 35–53% Polyethylene Oxide (PEO). At 100° C. the transference number of lithium cation in these films is 0.8–1.0, depending on the film composition.

The state of the art Li/PE batteries which use cathodes such as $V_2O_5$, $V_3O_{13}$, $Li_{0.5}M_nO_2$ do not have an internal electrochemical overcharge protection mechanism. Thus it is not practical to stack these cells in a series combination in a bipolar configuration.

SUMMARY OF THE INVENTION

The present invention relates to improvements in electrochemical cells, and especially in rechargable cells which have an alkali metal anode. The invention relates to composite solid electrolytes (CSE) which have an alkali metal transference number preferably greater than about 0.5. The invention further relates to electrochemical cells and other devices in which such CSEs can be used. More particularly one aspect of the present invention relates to a composite solid electrolyte (CSE), for use in electrochemical cells, which CSE has an alkali metal transference number larger than about 0.5, which CSE comprises up to about 40 volume-% electronically non-conductive oxide particles, of an average size of less than about 5μ, which are compatible with alkali metals, up to about 70 volume-% of an alkali metal salt MX or its solid complex with a polymers where M is an alkali metal and X an anion, which is believed to form a thin coating of said oxide particles or is in contact with these, which salt MX is not reducible by the alkali metal in such cell, up to about 80 volume-% of an electronically insulating elastomer, or an hydrocarbon polymer, which elastomer forms a complex with the alkali metal salt, and optionally up to about 20 volume-% of an aprotic organic solvent or low MW polymer, excluding CSE films of polyethylene oxide (PEO), LiI and $Al_2O_3$ only.

Preferably the CSE according to the invention contains oxide particles in the 0.05 to 0.5μ size range and their quantity is preferably from 1 to 20 volume-%, with the quantity of alkali metal salt being from 10 to 40 volume-%. Preferred is an elastic CSE which contains from about 30 to 70 volume-% elastomer and/or hydrocarbon polymer.

Preferably the particles used are particles of oxides of Al, Si, Mg, Ca, Ba, Sr or mixtures of any of these, which may contain some Li, Na, K.

Preferably the alkali metal of the MX salt is Li, Na or K and the anion X is $I^-$, $Br^-$, $Cl^-$, $S^-$, $N_3^-$, $CF_3SO_3^-$, $(CF_3SO_2)_2N^-$ or a mixture of any of these.

A wide variety of elastomers can be used. Preferably the elastomer is a polyalkylene oxide, possibly in combination with one or more of polymethylmethacrylate (PMMA), polymethylacrylate (PMA), polybutylacrylate (PBA), polybutylmethacrylate (PBMA), polyacrylonitrile (PAN), a polyalkylene glycol dialkyl ester or ether, where the ratio of the polyalkylene oxide to the other polymers varies from 50:1 up to 1:5. Polymers of choice are a mixture of polyethylene oxides of a MW in the $10^5$ to $10^7$ range where the n to MX ratio preferably is from 1 to 1.5 up to 1 to 20 (n in $P(EO)_n$). The solid CSEs preferably contain an electrolyte such as of up to 20 weight-% diglyme, triglyme or tetraglyme or of a crown ether or polyalkylene glycol dialkyl ether (or ester) of MW 500 to 50,000 or an aprotic organic solvent. Solvents of choice are propylene carbonate (PC), ethylene carbonate (EC), -butyrolactone, DMSO, Diethylene carbonate (DEC), THF, 2MTHF, Dioxolane, DME, or a mixture of these. The CSEs may comprise a MX salt doped by up to 10% atomic ratio of a polyvalent cation selected from Al, Ca, Mg, Sr and Ba cations.

According to further embodiment of the invention there are provided electrochemical cells where $t_{Li}^+$ may be lower than 0.5 which cells are immune to overcharge i.e. they have an internal electrochemical overcharge protection mechanism. These cells consist of PEO based CSE with EO to MX ratio of 6–40 where MX must be MI or a mixture of MI+MX with $MCF_3SO_3$ and/or $M(CF_3SO_2)_2N$ and a $FeS_2$, $NiS_2$ or $CoS_2$ cathode or a mixture of these.

The invention further relates to secondary electrochemical cells comprising a solid composite electrolyte as above described.

Cells according to the invention contain an anode made from an alkali metal (M) or alkali metal alloy or a $M_xC$ anode, where $M_xC$ is an alkali metal—carbon or graphite insertion compound where x<0.2; a composite solid electrolyte sheet, as described, compatible with the anode, and a cathode, which is easily charged and discharged against the relevant alkali metal and current collectors for the anode and the cathode, with the preferred M in $M_xC$ being Li.

Preferred are batteries where the alkali metal is lithium, the CSE consists of lithium iodide admixed with up to about 50 mole percent MI or LiX. Amongst suitable cathode materials are: $TiS_2$, $Li_xMnO_2$ (0.5<X<1), $V_2O_5$, $CoS_x$, $NiS_x$ (0.8<x<4.5), $V_3O_{16}$, FeS or $FeS_2$. The cathode material may be mixed with carbon and CSE components to form a composite cathode.

The cell can be assembled with a cathode in the discharge state. For example $2Fe+Li_2S$, $2Ni+Li_2S$, $2Co+Li_2S$, $Fe+Li_2S$, $Li_7V_3O_{16}$ etc. These are the final discharge product of the cell. Thus fine powders must be well mixed and cast with the composite polymer, instead of using charged state of the cathode.

These procedures are preferred in the case of using carbon or graphite anode, which on charge receives lithium.

For batteries having an overcharge protection mechanism, a preferred lithium salt in the solid electrolyte is LiI (5 to 50% W/W), and a cathode of: $CoS_2$, $FeS_2$, $NiS_2$ or mixtures of these.

The $Li/FeS_2$ system was claimed to be non-rechargeable in non-aqueous solutions. We found that Li/PE batteries with $FeS_2$, $NiS_2$, $CoS_2$ cathodes which use $LiAsF_6$ or $LiBF_4$ salts can not be effectively recharged. However when the MX salt (or its mixture) is used they can be effectively charged and recharged and moreover they have an internal electrochemical overcharge protection mechanism. Therefore they can be stacked in series to build a bipolar battery.

In order to use high voltage cathodes such as lithiated managanese dioxide or lithiated vanadiun oxides a LiCl based CSE must be used.

According to one embodiment of the invention there can be provided a multi-cell battery having a bipolar stack configuration, of the sequence: electronically conductive inert substrate, anode, CSE separator and cathode. It can consist of several plates or strings of cells in parallel configuration.

Such batteries can have thin (up to 200 micron each) electrodes, substrate and separator layers.

Preferred CSEs essentially comprise in combination a high surface area matrix of small particles, preferably oxides, generally below about 1 micron, and preferably in the 0.05 to 0.2 micron range, which are coated with a thin coating of suitable alkali metal salts or its solid complex with the polymer and either an organic elastomer, which is an electronic insulator, adapted to form a complex with the metal salt coating the matrix particles, or a suitable hydrocarbon polymer, preferably polyalkylene polymer. The novel composite solid electrolytes (CSEs) have the following advantages: (1) Alkali metal transference number greater than 0.5. (2) The salt anions are fully compatible with lithium and other alkali metals. (3) The novel CSE can be used to make a rechargeable $Li/FeS_2$, $Li/NiS_2$, $Li/CoS_2$ secondary cells which have an internal electrochemical overcharge protection mechanism.

As a result of (2) and because of other factors, the interfacial Li/CSE resistance is very low (up to one order of magnitude lower than that of prior art PEs) and very stable. The CSEs have a better mechanical strength and can be used above 100° C., if needed. The ionic conductivity of the CSEs at 20°–100° C. is similar to, or better than, that of prior art PEs.

The novel CSEs allow development of alkali metal batteries with a power density above 100 W/Kg and an energy density of above 100 Wh/Kg (based on full charged battery). It is believed that there provided coated very small Al, Mg or Si oxide particles (0.05 μm) with a thin MX layer or its solid complex with the polymer and which particles are bound together by means of a polymer electrolyte or polymer binder. It is believed that these particles, retain the interfacial and the vacancy conduction mechanism responsible for near unity transference number of M while the film retains the flexibility of the polymer. This results in Composite Solid Electrolytes (CSEs) with a transference number above 0.5, preferably up to close to unity. Another benefit of the oxide matrix is the immobilization of the molten phase when heating the CSE to above the melting point of the polymer. In addition to its binding, the PE provides ionic conductivity between the oxide particles coated by MX (or bridge between them). Others have used $Al_2O_3$ (2) or alumina based oxides to improve the mechanical strength of polymers but the Li transference number was low as they used a too low salt concentration, the wrong salt and too large $Al_2O_3$ particles. It is believed that the oxide effect on MX is a surface effect and not a bulk one. PEO is thermodynamically non-compatible with alkali metals. However, it is kinetically stable and reacts only slowly. There exist more stable binders which can be used, such as polypropylene, polyethylene, polystyrene, polyacrylates, polyethylene glycol cross-linked and other hydrocarbon based polymers.

According to this invention the properties of the previously mentioned CSE is improved, and the concept is extended to other CSE films containing a variety of inorganic oxides and a variety of alkali metal salts. The following alkali metal salts conduct in the solid state alkali metal cations through a metal cation vacancy mechanism, especially at the grain bounderies. The anions are totally compatible with the metal and the MX are electronic insulators: MF, MBr, MCl, MI, $M_2S$ (M is Li, Na, K). One purpose of this invention is to make good composite solid electrolytes which have $t_m$+close to unity and good ionic conductivity. This may be accomplished by:

1. Fabricating this CSE film of small oxide particles of multivalent elements such as the oxides of Al, Si, B, Ca, Sr, Mg or mixed oxides coated with M-halides. These oxides should be electronic insulators and compatible with the alkali metal. It is believed that the multivant elements in the oxide induce $M^+$ vacancies in the MX salt or in the solid MX-Polymer complex, thus increasing the cationic conductivity;

2. Adsorbing multivalent metal compounds on the surface of fine MX particles. These compounds should be compatible with the alkali metal. For example: $SrX_2$, $CaX_2$, etc.

3. Adsorbing on the fine MX particles one or a few monolayers of organic molecules (compatible with alkali metals) which preferentially complex the alkali metal cation (and not the X anion). Such as di-, tri-, tetra-Glymes, polyethylene glycol dimethyl ester, Crown ethers, PC (propylene carbonate) etc. These M-complexing agents are believed to help by inducing M vacancies in the solid MX by dissolving M from the MX surface and by connecting the solid particles by a liquid electrolyte phase, 4. Optionally doping these salts with multivalent cations such as $Al^{3+}$, $Ca^{2+}$, $Ba^{2+}$, $Mg^{2+}$, $B^{3+}$, $Sr^{2+}$.

Generally the dispersed particles will be of a size below 1 μm, and preferably in the 0.01 to 0.2 μm range. The coating of alkali halide (MX) applied to the particle surface is generally of the order of some hundreds of Angstroms (A), up to about 1 μm.

In most cases the non-complexing polymer will comprise not more than about 20 weight per cent of the composition, and preferably about 5 to 15 weight percent. A preferred component of ion complex forming polymer is PEO (polyethylene oxide). There can also be used polypropylene oxide and the like. Such complex forming polymers are used to up about 80% of the composition. Mobility of the ionic species occurs mainly in the amorphous phase. That is why it is preferable to add to PEO electrolytes polymers with low glass transition temperature, such as polyacrylate, polymethacrylate, polybutylmethacrylate, polymethylstyrene and their derivatives.

Addition of these components increases the rate of solubility of polymers in the casting solution: thus a homogeneous slurry can be readily received in a smaller volume of low dielectric constant organic solvent (for example—acetonitrile).

In addition at certain composition range the mixed polymer films have a better mechanical stability and higher ionic conductivity. For example in Table I CSE which accordered this invention contains PMMA (No. 2) has five times greater ionic conductively than has the state of the art CSE (No. 1) which does not contain PMMA.

BRIEF DESCRIPTION OF THE DRAWINGS

The invention is further illustrated with reference to the enclosed schematical drawings, not according to scale, in which.

DETAILED DESCRIPTION OF THE PREFERRED EMBODIMENTS

Figure 1:
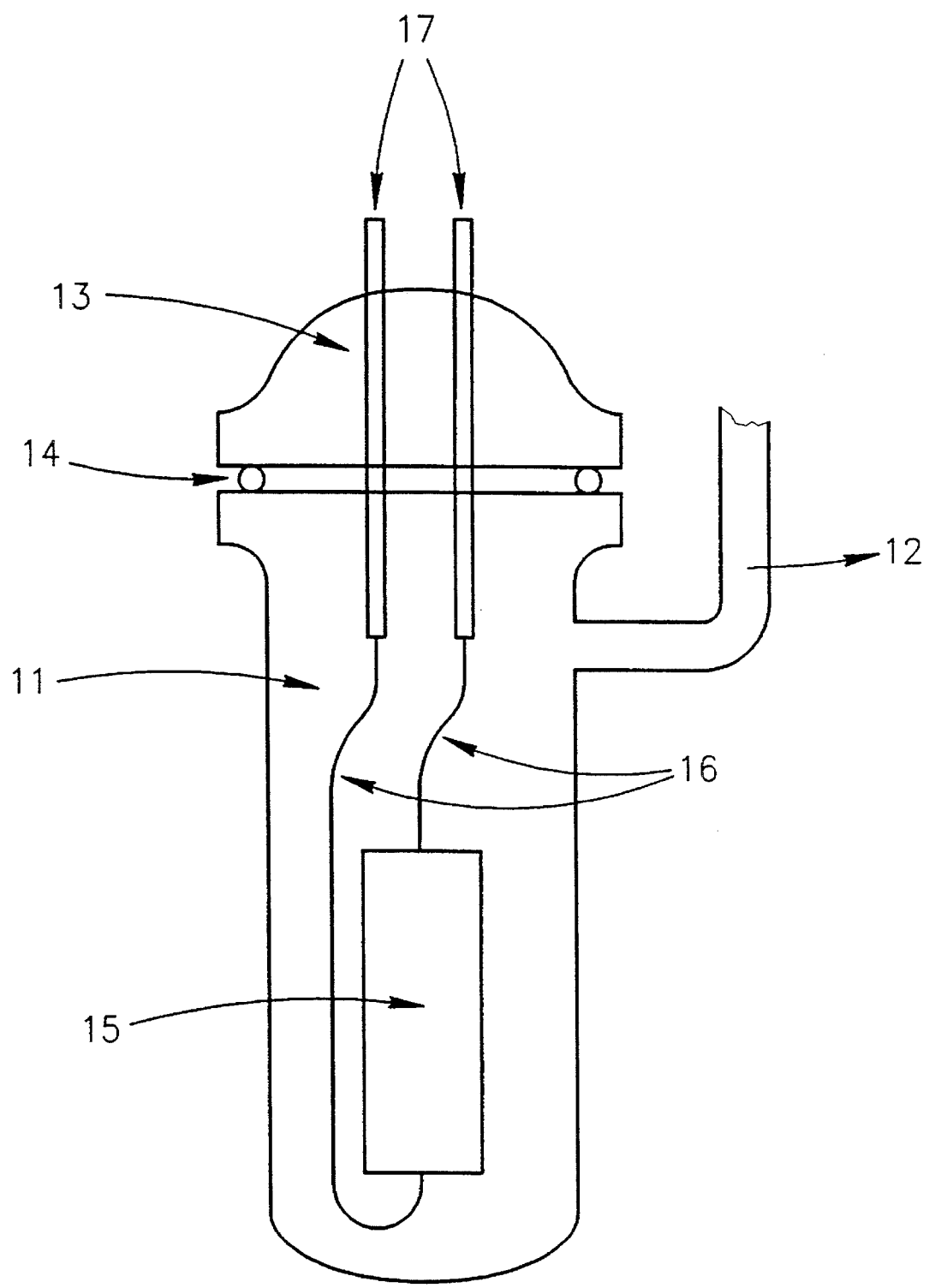
FIG. 1 is a side view of an electrochemical cell containing an electrolyte of the invention.

As shown in FIG. 1, the experimental battery incorporating a solid electrolyte of the invention comprises a glass container 11, provided with outlet 12, connected to a vacuum pump; 13 is the glass cover of the said vessel, with O-ring 14 between them. In the glass container 11, there are positioned a cell 15 illustrated in FIG. 2, connected by wires 16 to tungsten rods 17 which pass through the cover 13.

Figure 2:
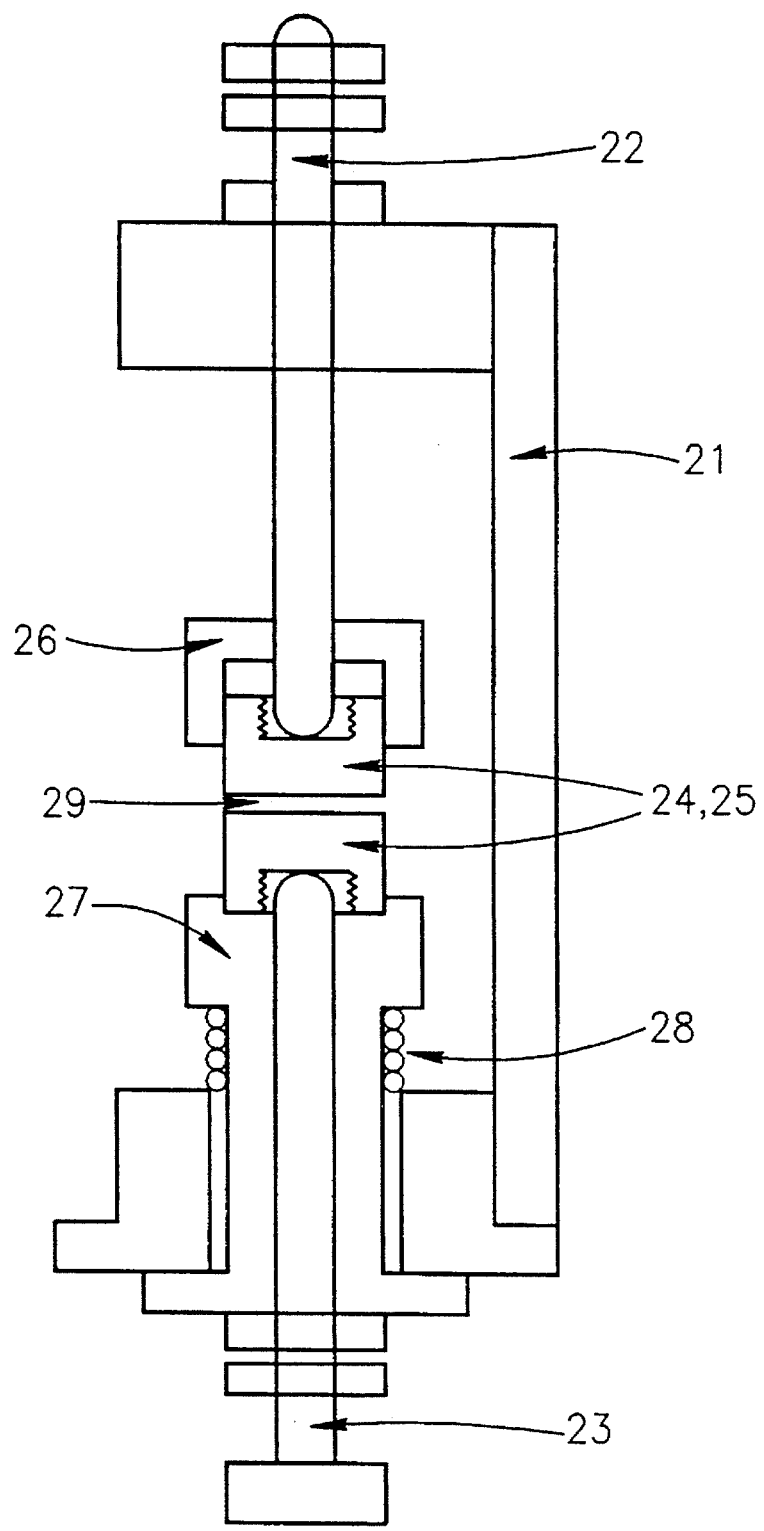
FIG. 2 illustrates arrangements for measurements of the properties of the novel electrolytes.
Figure 3:
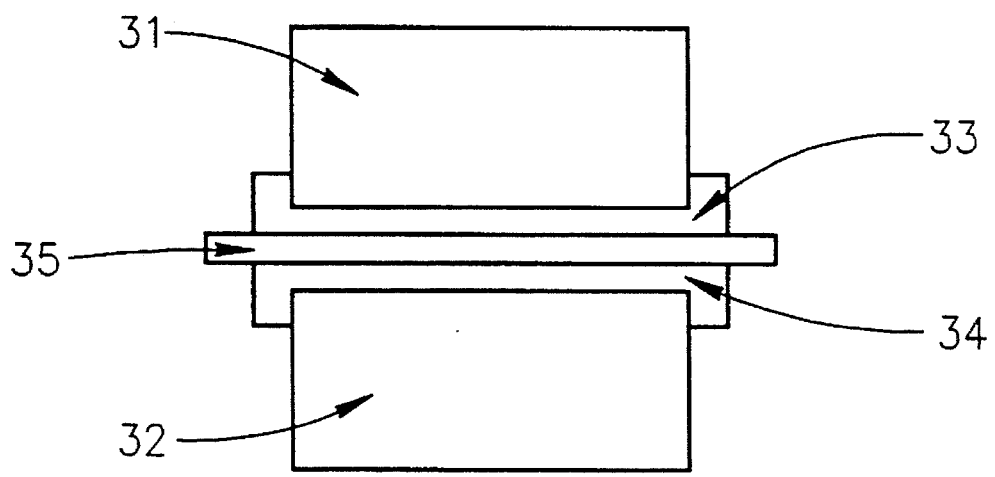
FIG. 3 illustrates a setup for conductivity measurements.

The unit designated as cell 15 in FIG. 1 is illustrated in FIG. 2 and it comprises s.s. holder 21, through which there pass screws 22 and 23, there being provided stainless steel (s.s) electrodes 24 and 25, held by ceramic (Macor) holder 26 and 27, pressed together by spring 28. This assembly is adapted to hold in place the devices illustrated in FIGS. 3 and 4, at position 29. The setup for conductivity measurements of FIG. 3 comprises s.s. electrodes 31 and 32, lithium foils 33 and 34, and the conductive polymer 35.

Figure 4:
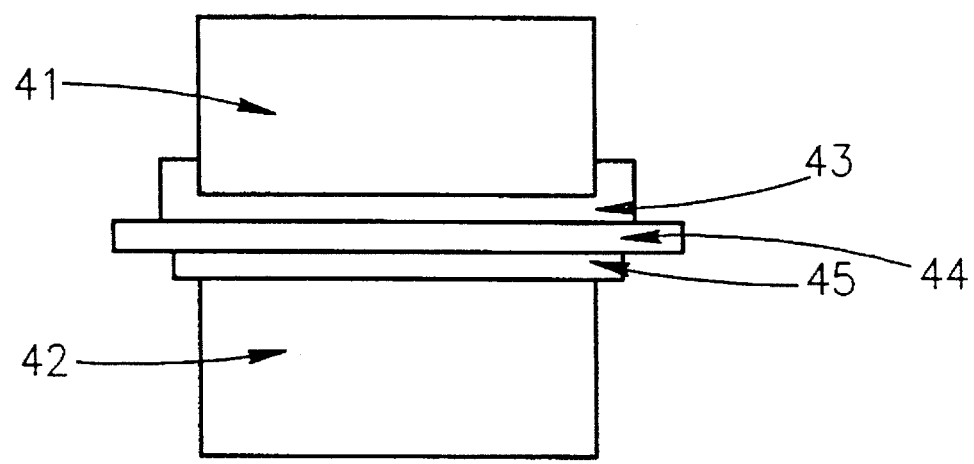
FIG. 4 illustrates a setup for battery tests.
Figure 5:
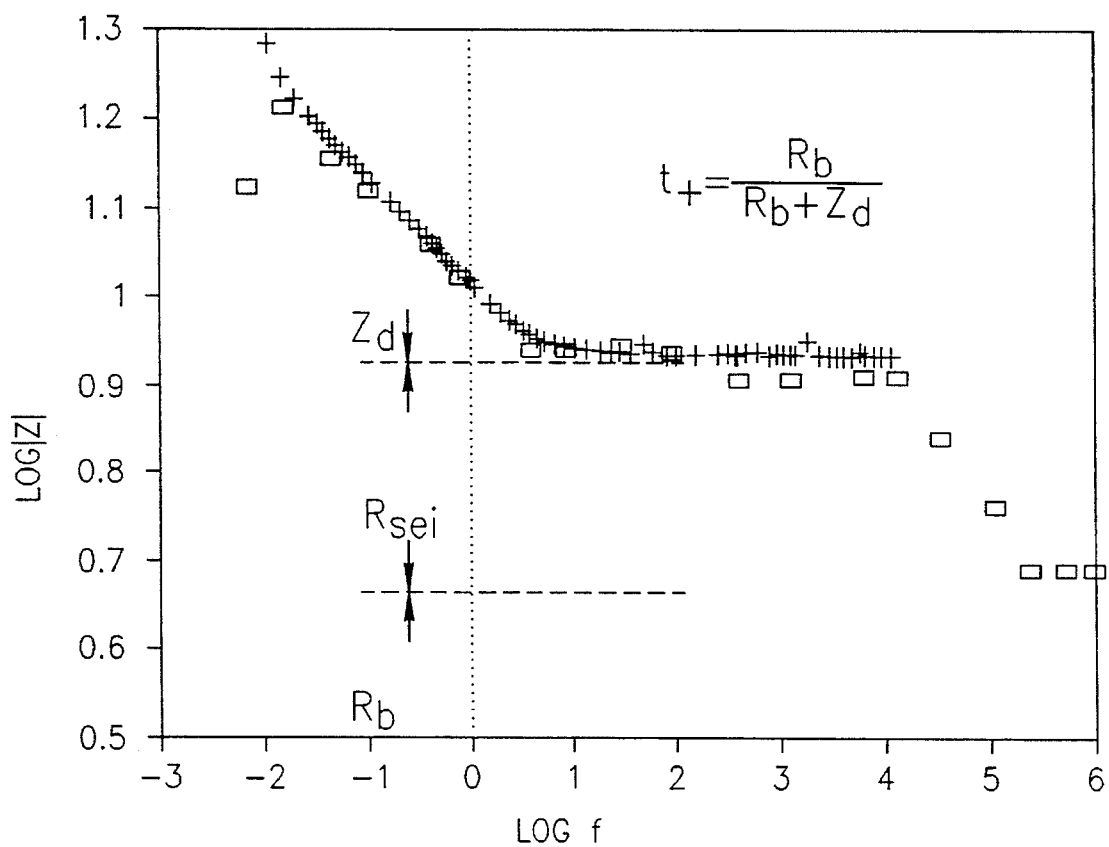
FIG. 5 illustrates Bode plot of CSE ($t_+<1$)
Figure 5A:
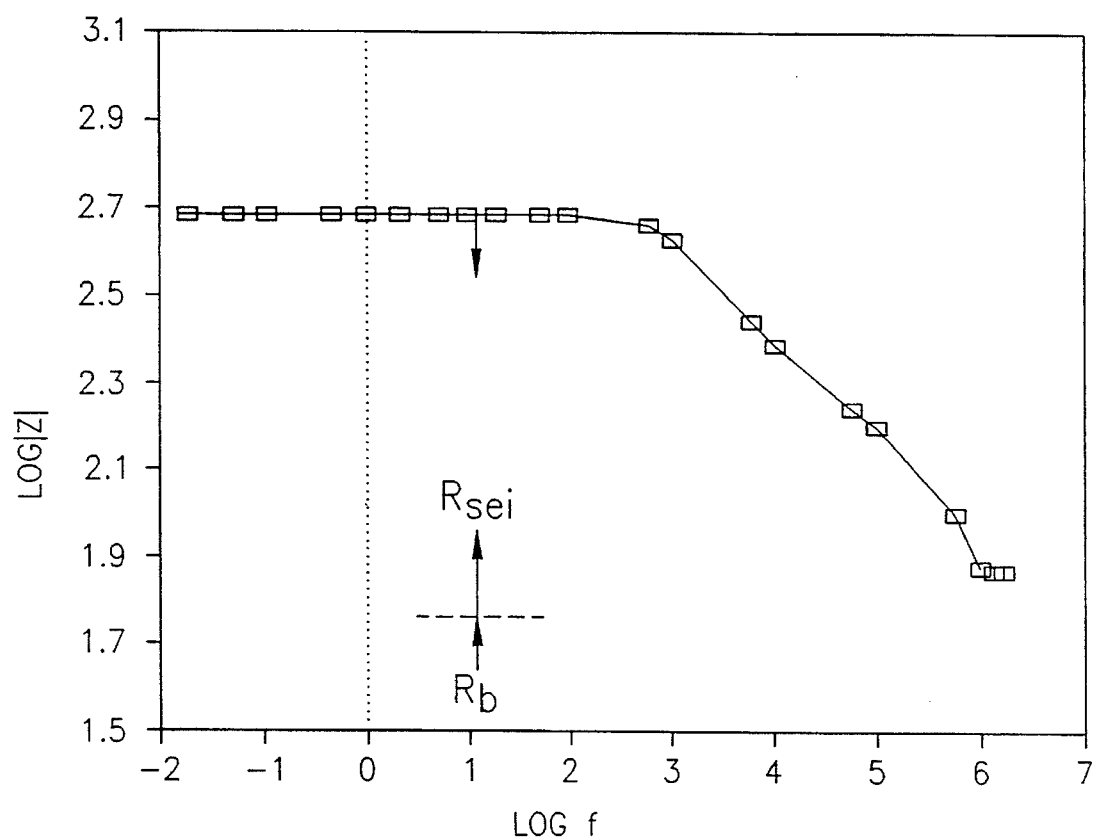
FIG. 5a illustrates Bode plot of CSE ($t_+=1$)
Figure 6:
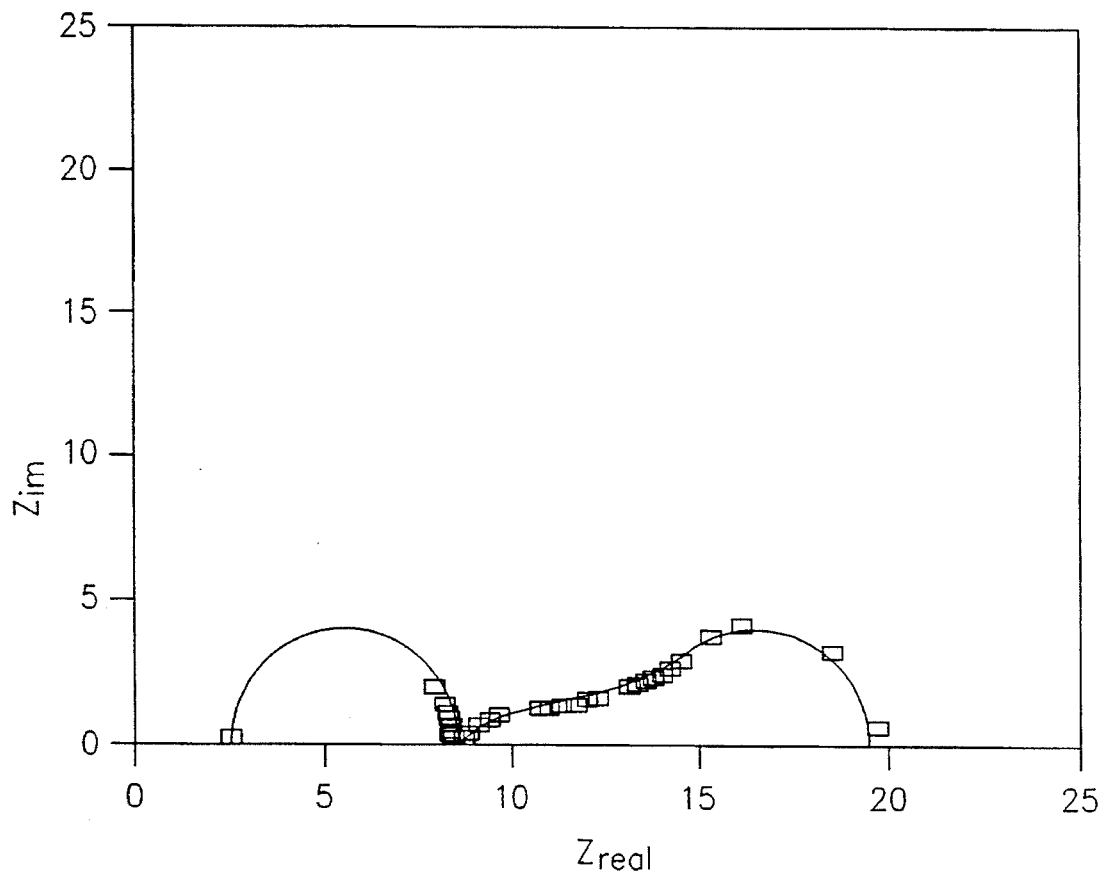
FIG. 6 illustrates Nyguest plot of CSE ($t_+<1$)

The setup for battery tests illustrated in FIG. 4 comprises s.s. electrodes 41 and 42, lithium foil 43, conductive polymer 44 and cathode 45. The transfer number of the lithium cations in the film can be calculated according to Equation 1 (Weston and Steele Solid— State Ionics, 7, 75 (1982):

$$t_{L1+} = \frac{R_b}{R_d + R_b}$$

where $R_d$ is the diffusion resistance of the film (PE or CSE) (1) and $R_b$ is the film resistance measured with a AC technique. $R_b$ and $R_d$ can be calculated from Bode Plot (FIG. 5) or Nyquist Plot (FIG. 6) using a small AC perturbation.

Measurements of the film produced according to Example 1 showed that $R_d$ is practically zero, and thus $t_{Li}^+=1$.

The invention is illustrated with reference to the following Examples, which are to be understood in a non-limitative manner.

EXAMPLE 1

To prepare CSE film with the composition LiBr-P(EO)$_4$ with 6% (v/v) SiO$_2$, we used: 304 mg LiBr, 614 mg PEO and 88.3 mg SiO$_2$.

The preparation of the composite polymer film was entirely performed in a dry-box, kept under an argon controlled atmosphere and having an average water content less than 20 ppm. The known quantity of the lithium salt was dispersed in AR dry acetonitrile (approximately 50 =1 cc per gram of polymer).

PEO MW=5×10$^6$ was added to the mixture. After stirring at room temperature for about 4 hours a homogeneous dispersion was obtained and high surface area SiO$_2$ was added. For quick and for best dispersion of the oxide in the slurry an ultrasonic bath was used. Then partial evaporation was allowed and the viscous (about 20 cm$^2$ volume) slurry was cast on a Teflon tray (64 cm$^2$ area) to form a film. The film was dried about 3 hours at room temperature under vacuum and later it was dried at 120° C. under vacuum. The final product was a film about 100 μm thickness.

The properties of the polymer materials have been examined in a suitable electrochemical cell (FIG. 1).

The electrode area was 1 cm$^2$ and the stack pressure was 8 Kg/cm$^2$. The polymer conductivity was measured by non blocking electrode (Li), by AC conductivity measurements at the frequency range of 10 mHz to 1 MHz. The conductivity of this film at 130° C. is $10^{-5}$ ohm$^{-1}$cm$^{-1}$.

EXAMPLE 2

A CSE was prepared as described in Example 1, starting with the following composition: 436 mg LiI; 84.2 mg AlI$_3$; 455 mg PEO and 134 mg Al$_2$O$_3$ (0.05μ particle size); 76 mg triglyme. Its conductivity at 110° C. is 1×10$^{-4}$ ohm$^{-1}$ cm$^{-1}$, $t_{Li}^+$ as calculated from equation 1 is about 0.8. In this film the EO to LiI ratio is about 3:1 and the volume percent of $Al_2O_3$ is 6%.

EXAMPLE 3

A 100μ thick CSE was prepared as described in Example 1. It contained 50% of PEO of low molecular weight (MW 100,000) and 50% of PEO of high molecular weight (MW 5,000,000).

The casting slurry contained: 336 mg LiI; 115 mg PEO (MW 100,000); 115 mg PEO (MW 5,000,000); 134 mg 0.05μ $Al_2O_3$ and 220 mg EC. The EO to LiI ratio is about 3:1 and the volume percent of $Al_2O_3$ is 6%.

The conductivity of film at 90° C. was $7 \times 10^{-5}$ $ohm^{-1}$ $cm^{-1}$. Its cationic transference number is close to unity.

EXAMPLE 4

A CSE was prepared as described in Example 1: a few films with different compositions were produced and measured with the use of AC technique. The results are summarized in Tables 1 and 2. Sample 1 is a state of the art film composition and has a low conductivity. Sample 1 with no PMMA and EC was described by Nagasubramanian et al. Proceeding of ECS Toronto meeting, October, 1992. We added to this composition PMMA and EC which improves film homogeneity and conductivity. Sample 2 has $t_{Li}^+=0.76$ at 120° C. and $t_{Li}^+=1$ at 90° C.

EXAMPLE 5

For comparison a CSE without EC was prepared as described in Example 1. The composition of the casting slurry was: 466 mg LiI, 458 mg PEO, 104 mg PMMA and 134 mg $Al_2O_3$. Its conductivity at 120° C. was $9.10^{-5}$ $ohm^{-1}$ $cm^{-1}$. Lithium cations transference number is 0.6.

EXAMPLE 6

A CSE was prepared as described in Example 1. A slurry containing PMMA with the following composition $(LiI)_1$ $P(EO)_3$ $P(MMA)_{0.3}$ $(EC)_1$ was cast. The casting slurry contained: 336 mg LiI, 330 mg PEO, 75 mg PMMA, 220 mg EC and 85 mg $SiO_2$. The volume concentration of $SiO_2$ in the final polymer was 6%. Its conductivity at 120° C. was $2.10^{-5}$ $ohm^{-1}$, $cm^{-1}$; Lithium cations transference number is close to unity.

EXAMPLE 7

A 200 micron thick CSE with a composition of 6% (v/v) MgO $(LiI)_2$ $P(EO)_3$ $P(MMA)_{0.25}$ ethylene carbonate $(EC)_1$ was produced following the procedure of Example 1. The conductivity of it at 120° C. was $2.10^{-4}$ $ohm^{-1}$ $cm^{-1}$. The value of lithium cations transference number was over 0.5.

EXAMPLE 8

A composite solid electrolyte film, containing poly(butylacrylate) with low glass transition temperature of −49° C. was obtained according to procedure of Example 1. The conductivity of a film with the composition of 6% $Al_2O_3 3LiI(PEO)_{10}$ $P(BA)_{0.5}$ $EC_1$ at 120° C. was $9 \times 10^{-4}$ $ohm^{-1}$ $cm^{-1}$. A 100 μm thick CSE contained: 136 mg LiI, 452 mg PEO, 65 mg PBA 90 mgEC.

EXAMPLE 9

A CSE was prepared as described in Example 1 A 100 micron thick film with the composition: 93 mg LiI, 183 mg PEO, 42 mg PMMA, 145 mg polyethylene glycol dimethyl ether (PEGDME) was produced. Its conductivity at 120° C. is $1 \times 10^{-3}$ $ohm^{-1}$ $cm^{-1}$ and its $t_{Li}^+$ is over 0.5.

EXAMPLE 10

A 100 μm thick film doped with $CaI_2$ was obtained following the procedure of Example 1. Its composition was 460 mg LiI, 30 mg $CaI_2$, 450 mg PEO, 120 mg PMMA, 200 mg EC and 134 mg $Al_2O_3$ (6% v/v). Its conductivity at 130° C. was $10^{-4}$ $ohm^{-1}$ $cm^{-1}$.

EXAMPLE 11

Figure 7:
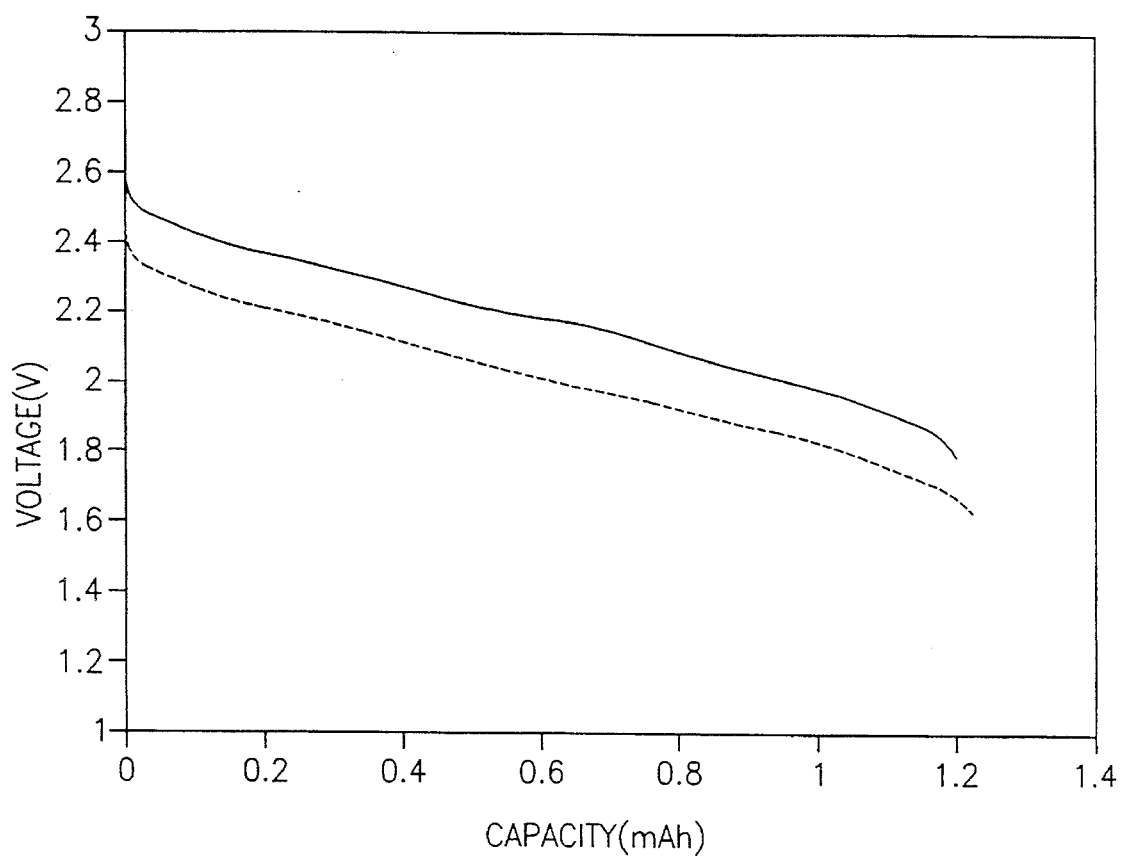
FIG. 7 illustrates charge-discharge plots of Li/CSE/TiS$_2$ cell.

A battery was assembled. It consisted of: a lithium anode, 150μ thick CSE separator of composition of Example 4, and a 100μ thick cathode with the following composition: 50% by volume CSE and the rest $TiS_2$ particles (fine particles). The cathode foil was prepared by dispersing $TiS_2$ particles (less than 50μ in size) in $P(EO)_{2.5}$ —LiI—$(PMMA)_{0.25}$ —$Al_2O_3$—acetonitrile solution and casting it into a Teflon mold. Later the cathode foil was dried at 120° C. under vacuum. This battery was discharged at 120° C. at I=0.10 Ma $cm^{-2}$ for 20 hours and then charged at 0.06 mA $cm^{-2}$ for 20 hours, (FIG. 7) average discharge voltage was 2.1 V and average charge voltage was 2.3 V.

Suitable alloys anodes which give similar results are alloys of the Li-Al-Mg type and of the Li-Al type. Good results were obtained with an alloy of (percent by weight) of 2 to 30% Li, at least 20% Al and at least 5% Mg. Good results were also attained with a LiMg alloy containing at least 20% magnesium.

EXAMPLE 12

A battery was assembled as described in Example 11 except that the CSE composition was LiI $P(EO)_3$ $PMMA_{0.3}$ 6% v/v MgO. It was cycled at 120° C. in the following regime: discharged at 0.05 mA/$cm^2$ for 10 hours and charged at 0.05 mA/$cm^2$ for 10 hours. It had a similar average discharge and charge voltage as in Example 11.

EXAMPLE 13

Figure 8:
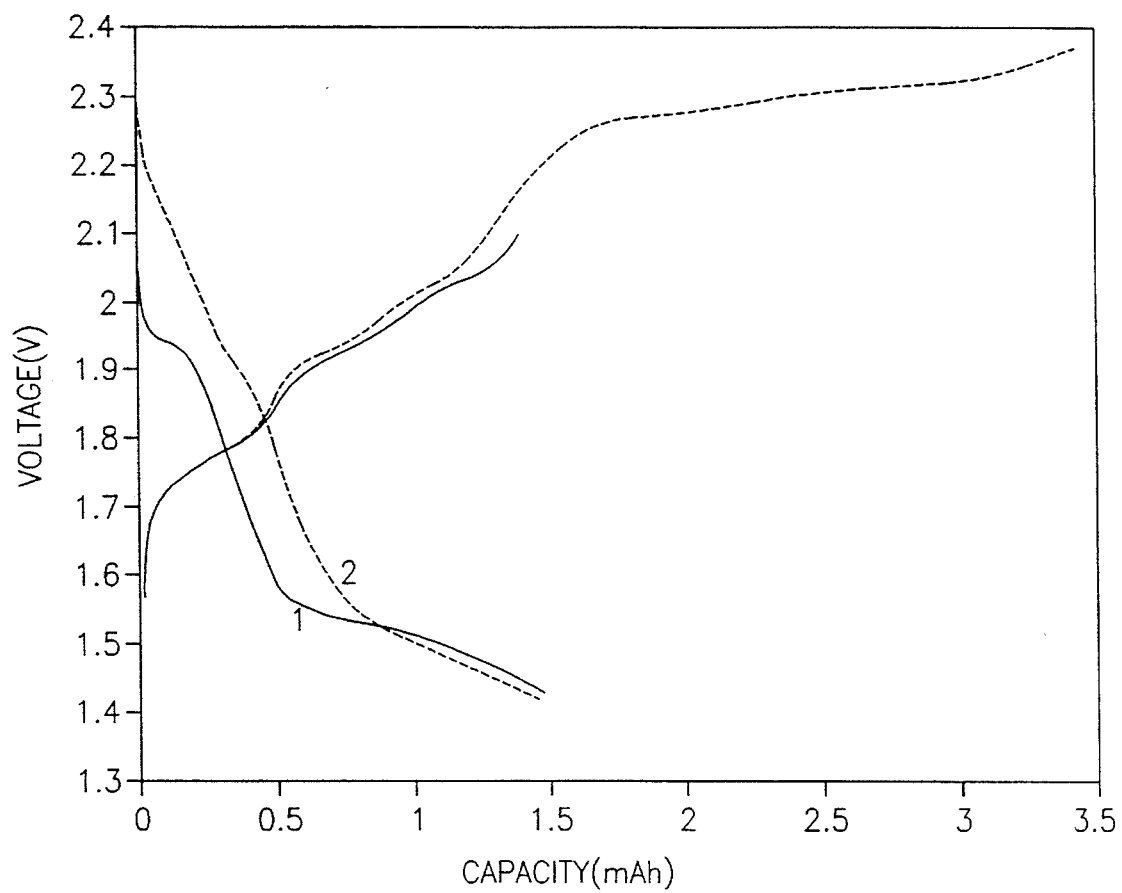
FIG. 8 illustrates charge-discharge plots of Li/CSE/FeS$_2$ cell.

A Li/CSE/$FeS_2$ cell was assembled. It consists of: a lithium anode, 150 μm thick CSE separator of composition of Sample 2, Table 1, Example 4 and a 50μ thick composite $FeS_2$ cathode which consists of 60% by volume CSE and the rest $FeS_2$ fine powder. The cathode was prepared as described in Example 11. The current collector for the cathode was a 2 mm thick graphite disc. $i_d$=0.1 mA$cm^{-2}$, $i_c$=0.05 mA$cm^{-2}$. The cell was held under a spring pressure of 12 kg/$cm^2$ and hermetically sealed in a glass vessel. It was cycled at 120° C. (FIG. 8). Charge and discharge capacities were similar and stable for over 20 cycles. This cell could be overcharged 100% with almost no loss in capacity.

A similar Li/CSE/$FeS_2$ cell was assembled. It consists of a lithium anode, 100 μm thick CSE separator of composition of Sample 4, Table 1, Example 4 and 50 μm thick composite $FeS_2$ cathode which consists of 65% by volume the same CSE and the rest was fine $FeS_2$ powders.

The cell was held under a spring pressure of 5 kg/$cm^2$. It was cycled at 135° C. at 0.05 mA$cm^{-2}$ for charge and 0.3 mA$cm^{-2}$ for discharge.

Figure 9:
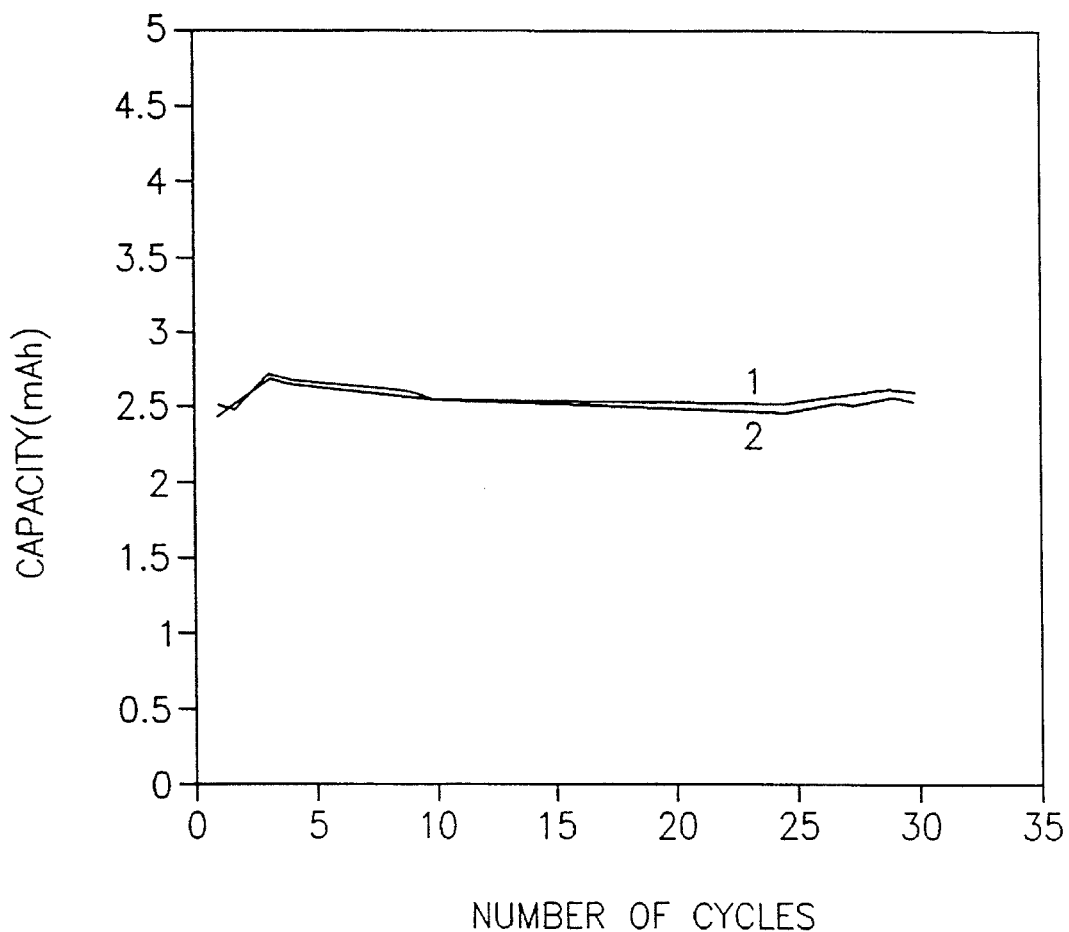
FIG. 9 illustrates plot of capacity vs number of cycles for Li/CSE/FeS$_2$ cell.
Figure 10:
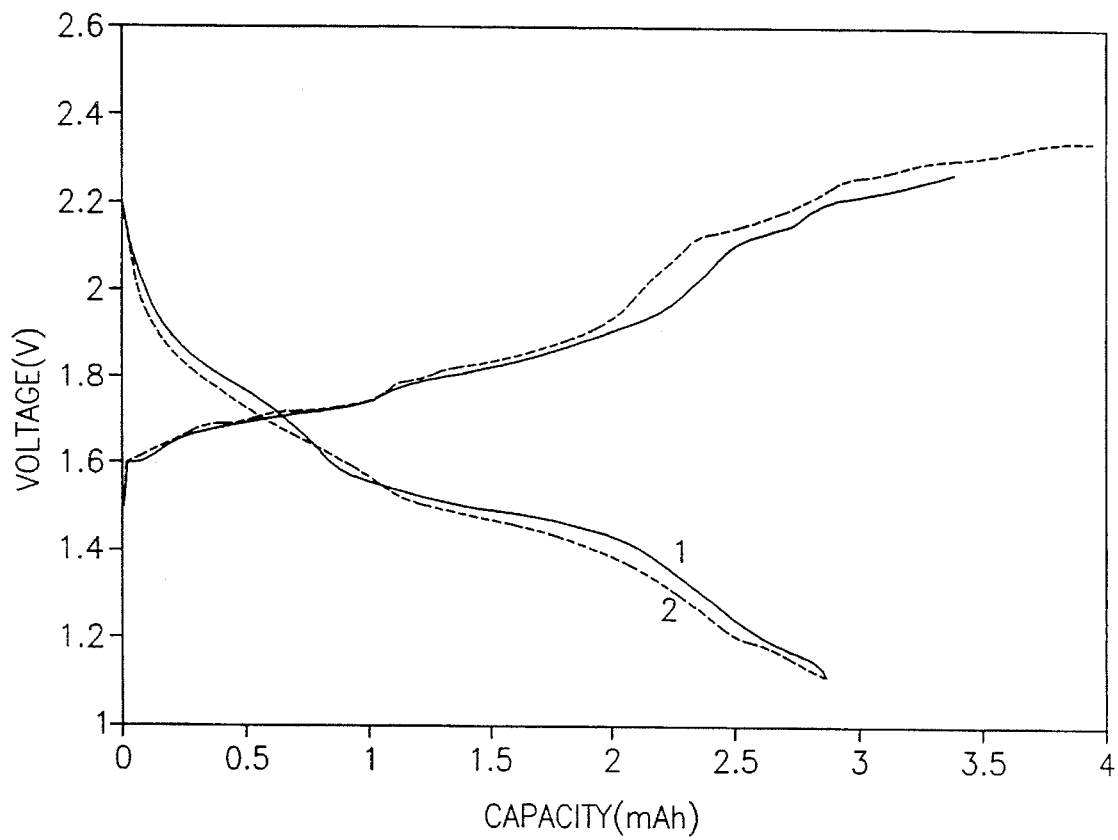
FIG. 10 illustrates charge-discharge plots of Li/CSE/FeS$_2$ cell.

Cut off voltages were 1.1 V for discharge and 2.15 V for charge. The cell delivered above 2 mAh per cycle for over 30 cycles (FIG. 9). It could be overcharged at 2.4 V for more than 30% with no loss in capacity (FIG. 10). Similar results were obtained when the cell was assembled with a cathode in the discharged state i.e. by a cast of a mixture of fine Fe and $Li_2S$ powders instead of $FeS_2$ powder.

EXAMPLE 14

A battery was assembled as described in Example 13. The cathode was 50 μm thick composed of $FeS_2$ 35% (v/v) and 65% (v/v) CSE, CSE thickness was 100 μm. The CSE casting slurry contained 122 mg $LI(CF_3SO_2)_2N$, 268 mg $Al_2O_3$, 561 mg PEO 40 mg, PMMA and 71 mg EC. Stack pressure was 4 $kg/cm^2$. The cell was cycled at 130° C. between 1.1 to 2.45 V for over 10 cycles at 0.3 mA discharge current and 0.05 mA charge current. It delivered 2.3 mAh/$cm^2$.

EXAMPLE 15

Figure 11:
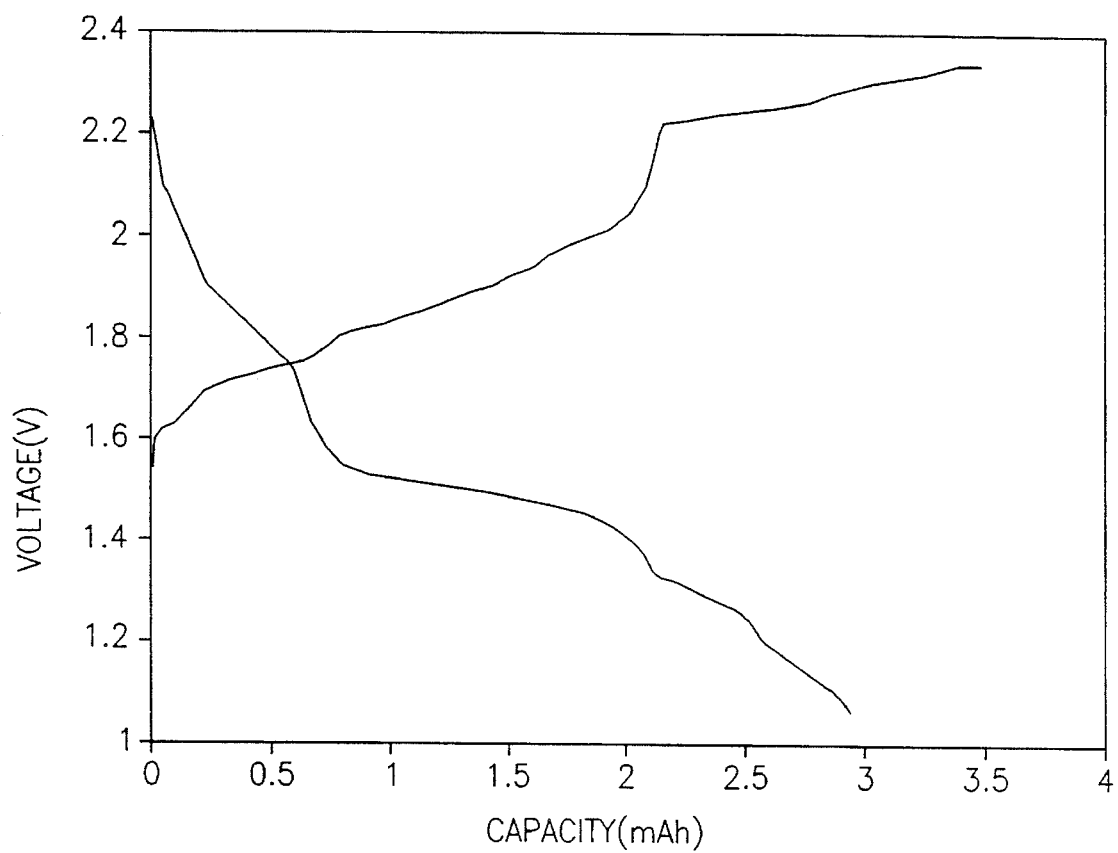
FIG. 11 illustrates charge-discharge plots of Li/CSE/FeS$_2$ cell.

A battery was assembled as described in Example 13 with stack pressure of 3 $kg/cm^2$. The CSE composition was $(Li(CF_3SO_2)_2N)_{0.7}$ $(LiI)_{0.3}$ $P(EO)_{16}$, $P(MMA)_{0.5}$ and 9% by volume $Al_2O_3$. It was cycled at 130° C. at discharge current at 0.3 $mAcm^{-2}$ and charge current of 0.045 $mA/cm^{-2}$. The cell delivered over 2.5 mAh for over 10 cycles (FIG. 11).

EXAMPLE 16

A battery was assembled as described in Example 15 with 100 μm thick CSE separator of Sample 4, Table 1, Example 4. The anode was 1 mm thick sodium metal. This cell was cycled at 80° C. between 0.8 and 2.4 V at discharge and charge currents of 0.03 mA. The cell delivered about 0.1 mAh for several cycles.

EXAMPLE 17

A battery was assembled as described in Example 13. It consists of a $NtS_2$ cathode instead of $FeS_2$ cathode, 100 μm thick CSE of composition of Sample 4, Table 1, Example 4. The stack pressure was 4 $kg/cm^2$. It was cycled for over 10 cycles at 135° C. between 1.1 and 2.1 5V at 0.1 mA discharge and 0.05 mA charge. It delivered 1.5 $mAh/cm^2$.

EXAMPLE 18

A battery was assembled and tested as described in Example 17, except the cathode is $CoS_{2.5}$. It delivered about 1.8 mAh for over 5 cycles.

EXAMPLE 19

A Li/CSE/$LiMnO_2$ battery was assembled. It consists of Li anode, 150 μm thick CSE and 100 μm thick composite $LiMnO_2$ cathode. CSE film was casted from a slurry consisting of 78 mg LiCl; 483 mg PEO; 46 mg PMMA; 134 mg $Al_2O_3$; 161 mg EC. The cathode consist of 65% v/v CSE, and 25% v/v $LiMnO_2$ and 10% v/v carbon powder and prepared as described in Example 11. The cell was cycled at 135° C. between 2.5 to 3.5 V at current of 0.02 mA for both charge and discharge. It delivered 0.1 mAh for over 5 cycles.

EXAMPLE 20

A CSE was prepared as described in Example 1. 100μ thick film with the composition: 113 mg LiI, 60 mg KI, 480 mg PEO, 60 mg PMMA, 107 mg EC, 301 mg $Al_2O_3$, was produced. Its conductivity at 120° C. is $1.5 \times 10^{-3}$ $Ohm^{-1}$ $Cm^{-1}$.

EXAMPLE 21

A CSE with the composition 25% (v/v) PAN, 25% v/v EC; 25% v/v PC, 24% v/v Dioxolane 6% $Al_2O_3$ (v/v) and 1.0M $LiCF_3SO_3$. The conductivity of this CSE at room temperature was $1.1 \times 10^{-3}$ $Ohm^{-1}$ $Cm^{-1}$.

EXAMPLE 22

A cell was assembled with carbon anode consisted of 35% (v/v) fine powder of petroleum coke and 65% (v/v) CSE with the following composition: 0.3M $Li(CF_3-SO_2)_2N$, 0.7M LiI, 30% v/v, PEO 30% v/v PC, 30% v/v DEC, 6% (v/v) $Al_2O_3$. The counter electrode was a lithium foil, and the CSE separator between them consisted of the same composition. This cell was charged-discharged at 80° C. between the anode composition $Li_0C_6$ and $Li_{0.4}C_6$ for over 50 cycles.

TABLE 1

The Effect of Composition on $Z_T$, $R_{SEI}$, $R_{CSE}$, σ,$t_+$ at 120° C.

| No CSE Composition | $Z_T$ $\Omega CM^2$ | $R_{CSE}$ $\Omega CM^2$ | $Z_D$ $2CM^2$ | $R_{SEI}$ $\Omega CM^2$ | σ $\Omega^{-1}CM^{-1}$ (×$10^4$) | $t_+$ |
|---|---|---|---|---|---|---|
| LiI—$P(EO)_3$*+ | 216 | 168 | 34 | 14 | 1.12 | 0.83 |
| LiI—$P(EO)_{2.5}X_{0.25}$* | 75 | 34 | 11 | 30 | 5.9 | 0.7 |
| LiI—$P(EO)_6X_1$° | 63 | 20 | 32 | 11 | 5.0 | <0.38 |
| LiI—$P(EO)_9X_{0.5}$° | 57 | 10 | 24 | 23 | 10.0 | <0.3 |

Sample 1 is state of the art example and not a part of this invention.

*—Thickness 200μ o—Thickness 100μ

+—12 Vol % $Al_2O_3$, the rest have 6% x—PMMA; $X_{0.5}$ means mole ratio of 0.5 PMMA to LiI. Samples 2, 3 and 4 contain 1 mole of EC to one mole of LiI in the casting slurry.

$Z_D$—diffusion impendance, σ-CSE conductivity $Z_T$—Total impendance; $R_{SEI}$: the resistance of the solid electrolyte interphase on the surface of the lithium i.e. the Li/CSE interfacial resistance not to confuse with CSE resistance ($R_{CSE}$)

TABLE 2

The Effect of Composition on $Z_T$, $R_{SEI}$, $R_{CSE}$, $\sigma$, $t_+$ at 90° C.

| No CSE Composition | $Z_T$ $\Omega CM^2$ | $R_{CSE}$ $\Omega CM^2$ | $Z_D$ $2CM^2$ | $R_{SEI}$ $\Omega CM^2$ | $\sigma$ $\Omega^{-1}CM^{-1}$ $(\times 10^4)$ | $t_+$ |
|---|---|---|---|---|---|---|
| LiI—P(EO)$_3$**+ | 806 | 613 | 0 | 194 | 0.3–0.4 | 1 |
| LiI—P(EO)$_{2.5}$X$_{0.25}$* | 264 | 58 | 0 | 206 | 3.4 | 1 |
| LiI—P(EO)$_6$X$_3$° | 180 | 34 | >75 | 70 | 2.9 | <0.32 |
| LiI—P(EO)$_9$X$_{0.5}$° | 182 | 15–20 | >68 | 92 | 4.5 | <0.25 |

*Thickness 200μ
°Thickness 100μ
+12 Vol % Al$_2$O$_3$, the rest have 6%

Example 1—not part of this application.

We claim:

1. A composite solid electrolyte (CSE), for use in electrochemical cells, said CSE having an alkali metal transference number larger than about 0.5, wherein said CSE consists of:

from 1 to about 40 volume-% electronically non-conductive oxide particles of an average size of less than about 5μ, which are compatible with alkali metals, 10 to 80 volume-% of an alkali metal salt MX, where M is an alkali metal and X an anion, which salt forms a thin coating on said oxide particles or is in contact with said oxide particles, which salt MX is not reducible by the alkali metal in said cell, about 5 to about 80 volume-% of an electronically insulating elastomer, including a hydrocarbyl polymer, which elastomer forms a complex with the alkali metal salt, and up to 20 volume-% of an aprotic organic solvent of low MW polymer, having a molecular weight of up to 5000, which polymer serves as plasticizer, excluding a system of polyethylene oxide (PEO), LiI and Al$_2$O$_3$ only.

2. A CSE according to claim 1, where the size of the oxide particles is in the 0.05 to 0.5μ size range, where the oxide particles are present in a quantity of from 1 to 20 volume-%, the alkali metal salt is present in a quantity of from 10 to 40 volume-%, and the CSE contains from about 30 to 70 volume-% of at least one member selected from the group consisting of elastomer and hydrocarbyl polymer.

3. A CSE according to claim 1, where the oxide particles comprise at least one member selected from the group consisting of oxides of Al, Si, Mg, Ca, Ba and Sr, and mixtures, thereof the CSE optionally contains Li, Na, K, where the alkali metal of the MX salt is a member selected from the group consisting of Li, Na and K and the anion X is a member selected from the group consisting of I$^-$, Br$^-$, Cl$^-$, S$^{2-}$, CF$_3$SO$_3^-$, (CF$_3$SO$_2$)$_2$N$^-$, and a mixture thereof, where the elastomer is a polyalkylene oxide, optionally in combination with one or more polymers selected from the group consisting of PMMA, PMA, PBA, PBMA, PAN, a polyalkylene glycol dialkyl ester and ether, where the ratio of the polyalkylene oxide to the one or more polymers is from 50:1 to 1:1, and an electrolyte in which the polymer is a mixture of polyethylene oxides P(EO)$_n$) of a MW in the 10$^5$ to 10$^7$ range where the 40 EO to MX ratio is 2 to 30.

4. A composite solid electrolyte according to claim 1 containing zero to 20 weight-% of a member selected from the group consisting of diglyme, triglyme, tetraglyme, polyalkylene glycol dialkyl ether or ester of MW 500 to 50,000 and an aprotic organic solvent which is a member selected from the group consisting of propylene carbonate, ethylene carbonate, butyrolactone, DMSO, diethylene carbonate, THF, 2MTHF, dioxolane, DME and a mixture thereof.

5. Composite Solid Electrolyte according to claim 1, where the MX salt is doped by up to 10% atomic ratio of a polyvalent cation which is a member selected from the group consisting of Al, Ca, Mg, Sr and Ba.

6. A primary or secondary electrochemical battery which battery comprises a composite solid electrolyte wherein said composite solid electrolyte consists of:

3 to 40 volume-% electronically non-conductive oxide particles of an average size of less than about 5μ, which are compatible with alkali metals, 5 to 80 volume-% of an alkali metal salt MX, where M is an alkali metal and X an anion, which salt forms a thin coating on said oxide particles or is in contact with said oxide particles, which salt MX is not reducible by the alkali metal in said cell, 10 to 80 volume-% of an electronically insulating elastomer forms a complex with the alkali metal salt, and 2 to 20 volume-% of an aprotic organic solvent of low MW polymer, having a molecular weight of up to 5000, which polymer serves as plasticizer, excluding a system of polyethylene oxide (PEO), LiI and Al$_2$O$_3$ only.

7. A primary or secondary electrochemical battery according to claim 6, including an anode comprising a member selected from the group consisting of an alkali metal (M), alkali metal alloy, and M$_x$C, where M is an alkali metal or alloy thereof and x is from 0.05 to 0.5, a separator comprising said composite solid electrolyte which is compatible with the anode, wherein the cathode is charged and discharged against the alkali metal and current collectors for the anode and the cathode, where the cathode material comprises a member selected from the group consisting of TiS$_2$, Li$_x$MnO$_2$ (0.5<x<1, V$_2$O$_5$, CoS$_x$NiS$_x$ (0.8<x<4.5), V$_3$O$_{16}$, FeS and FeS$_2$, which is optionally mixed with carbon and a composition identical with that of the CSE to form a composite cathode.

8. A battery according to claim 6, where the lithium salt in the solid electrolyte is LiI (15–70%) W/W, and up to 50 mol % of at least one member selected from the group consisting of LiBr, LiCF$_3$SO and Li(CF$_3$SO$_2$)$_2$N, and a cathode selected from the group consisting of CoS$_x$, NiS$_x$, (0.8<x<4.5) and FeS$_2$.

9. A battery according to claim 6 where the alkali metal is sodium, the CSE contains sodium halide and a cathode active material is a member selected from the group consisting of FeS, CoS$_x$ (0.8<x<4.5) and FeS$_2$, and an oxide matrix is selected from the group consisting of Na-Al$_2$O$_3$, Na"βAl$_2$O$_3$, Al$_2$O$_3$, SiO$_2$ and MgO, where the salt in the CSE is selected from NaI and NaBr.

10. A battery according to claim 6 comprising a multi-cell battery having a bipolar stack configuration, of the sequence: electronically conductive inert substrate, anode, CSE and cathode having up to 300 micron thick electrodes, substrate and separator layers.

11. A battery according to claim 6 comprising plates or strings of cells in parallel configuration.

12. A battery consisting of: an anode comprising a member selected from the group consisting of alkali metal, alkali metal alloy and $M_xC$, where M is alkali metal or alkali metal alloy and $x<0.2$; and anode and cathode compatible polymer electrolyte consisting of at least one alkali metal salt in which the cathode can be charged and discharged, an elastomer which can complex said at least one salt; and a cathode or composite $NiS_x$ and $CoS_x$ ($0.8<x<4.5$), where the polymer electrolyte contains oxides of Al, Si, Mg, Ca, Ba, Sr and mixtures thereof, the elastomer optionally contains a polymer selected from the group consisting of PMMA, PMA, PBA PBMA, PAN, a polyalkylene glycol dialkyl ester and ether, and solvent selected from the group consisting of propylene carbonate, ethylene carbonate, butyrolactone, DMSO, diethylene carbonate, THF, 2MTHF, dioxolane, DME and mixtures thereof, with the preferred M being Li.

13. A secondary battery consisting of: an alkali metal or alkali metal alloy of $M_xC$ (where M is alkali metal or alkali metal alloy and $_x<0.2$) anode; an anode and cathode compatible polymer composite solid electrolyte consisting of an alkali metal salt in which the cathode can be charged, an elastomer which can complex said salt; and a cathode or composite cathode which comprises a member selected from the group consisting of $FeS_2$, FeS, $NiS_x$, And $CoS_x$ ($0.8<_x<4.5$), where the polymer electrolyte contains oxides of Al, Si, Mg, Ca, Ba, Sr and mixtures thereof, and the elastomer optionally contains a polymer selected from the group consisting of PMMA, PMA, PBA, PBMA, PAN, a polyalkylene glycol dialkyl ester and ether, and solvent selected from the group consisting of propylene carbonate, ethylene carbonate, butyrolactone, DMSO diethylene carbonate, THF, 2MTHF, dioxolane, DME and a mixture thereof, with the preferred M being Li.

14. A battery according to claim 6 where the cell is assembled with a cathode in a discharged state.

15. A battery according to claim 7, wherein M is lithium.

16. A battery according to claim 13, wherein M is lithium.

* * * * *